US009465620B2

(12) United States Patent
Krig et al.

(10) Patent No.: US 9,465,620 B2
(45) Date of Patent: Oct. 11, 2016

(54) SCALABLE COMPUTE FABRIC

(71) Applicant: Intel Corporation, Santa Clara, CA (US)

(72) Inventors: Scott Krig, Folsom, CA (US); Teresa Morrison, Fort Collins, CO (US)

(73) Assignee: INTEL CORPORATION, Santa Clara, CA (US)

( * ) Notice: Subject to any disclaimer, the term of this patent is extended or adjusted under 35 U.S.C. 154(b) by 679 days.

(21) Appl. No.: 13/721,400

(22) Filed: Dec. 20, 2012

(65) Prior Publication Data

US 2014/0181472 A1   Jun. 26, 2014

(51) Int. Cl.
*G06F 9/30* (2006.01)
*G06F 9/38* (2006.01)
*G06F 15/78* (2006.01)

(52) U.S. Cl.
CPC ......... *G06F 9/3897* (2013.01); *G06F 9/3873* (2013.01); *G06F 15/7867* (2013.01)

(58) Field of Classification Search
CPC .. G06F 9/4436; G06F 9/3824; G06F 9/3836; G06F 9/30181; G06F 9/3867; G06F 15/76; G06F 9/3897; G06F 9/3851; G06F 9/3885; G06F 9/3842; G06F 9/3873
See application file for complete search history.

(56) References Cited

U.S. PATENT DOCUMENTS

| | | | |
|---|---|---|---|
| 5,524,265 A * | 6/1996 | Balmer et al. | 712/38 |
| 6,128,720 A * | 10/2000 | Pechanek et al. | 712/20 |
| 7,818,699 B1 | 10/2010 | Stuber et al. | |
| 8,711,161 B1 * | 4/2014 | Scotzniovsky et al. | 345/531 |
| 2005/0174353 A1 | 8/2005 | Alcorn et al. | |
| 2005/0243094 A1 * | 11/2005 | Patel et al. | 345/506 |
| 2006/0179186 A1 * | 8/2006 | Nye | G06F 5/06 710/52 |
| 2007/0030277 A1 * | 2/2007 | Prokopenko et al. | 345/506 |
| 2008/0301413 A1 * | 12/2008 | Wang | 712/220 |
| 2009/0293061 A1 | 11/2009 | Schwinn et al. | |
| 2011/0093854 A1 * | 4/2011 | Blanc et al. | 718/101 |
| 2012/0036509 A1 | 2/2012 | Srinivasan et al. | |

FOREIGN PATENT DOCUMENTS

JP          2005531848 A         10/2005

OTHER PUBLICATIONS

Abdelaziz et al, Scalable Dynamic Clustering—Dynamic Clustering and Management White Paper, Sun Microsystems, Inc., Jul. 2007, 8 pages.
Cisco, Design Considerations for High Availability and Scalability in Blade Server Environments, White Paper, Cisco Systems, Inc., 2009, 9 pages.
Intel, Intel Fabric Suite 7 Maximizing Investments in High Performance Computing, 2012 Intel Corporation, 5 pages.
International Search Report, PCT Application No. PCT/US2013/074364, Date of Mailing Mar. 31, 2014, 4 pages.

* cited by examiner

*Primary Examiner* — Farley Abad
(74) *Attorney, Agent, or Firm* — International IP Law Group, P.L.L.C.

(57) ABSTRACT

A method and apparatus for providing a scalable compute fabricare provided herein. The method includes determining a workflow for processing by the scalable compute fabric, wherein the workflow is based on an instruction set. A pipeline in configured dynamically for processing the workflow, and the workflow is executed using the pipeline.

28 Claims, 6 Drawing Sheets

SCALABLE COMPUTE FABRIC

TECHNICAL FIELD

This disclosure relates generally to computing architectures. More specifically, the disclosure relates to a scalable compute fabric.

BACKGROUND ART

Current computing systems are typically designed for general use cases. For example, current computing systems include at least one central processing unit (CPU) that is developed for a variety of instruction sets. Some computing systems may also include a graphics processing unit (GPU). The GPU is generally specialized for processing graphics workloads that benefit from processing large blocks of data in parallel. Both CPUs and GPUs include dedicated circuitry to perform arithmetic and logical operations, which may be referred to as an arithmetic and logic unit (ALU). The processing cores of both CPUs and GPUs are fixed in size and identical to the other cores of the respective processor. Furthermore, the processing cores of current CPUs and GPUs are powered on, even when not in use.

BRIEF DESCRIPTION OF THE DRAWINGS

The following detailed description may be better understood by referencing the accompanying drawings, which contain specific examples of numerous objects and features of the disclosed subject matter.

DESCRIPTION OF THE EMBODIMENT

As discussed above, compute elements or compute resources in a system include various components such as a CPU, GPU, Input/Output(I/O) controllers, I/O busses, memory devices, and other dedicated logical blocks which are connected in a fixed manner and cannot be reconfigured to support special processing pipelines and workflow requirements. Furthermore, the various compute elements may remain in an active, powered on state, even when not in use. Embodiments of the present techniques provide for a scalable compute fabric in which the compute elements are available for use as needed, and dynamically configurable for assignments to special purpose pipelines across I/O connections and busses between compute elements, In this manner, workflows are supported in a dynamic fashion, which enables performance and power to be adjusted accordingly to reach better power and performance targets. Additionally, embodiments provide a scalable compute fabricin which the compute elements or compute resources can be dynamically reconfigured to service a particular workload and many simultaneous workloads. Furthermore, compute elements may be powered off when not in use. The scalable compute fabric is dynamically configured into multiple pipelines at run-time, each of which are controlled and sequenced in a manner allowing for Multiple Instructions and Multiple Data (MIMD) streams to be fed into the scalable compute fabric using a plurality of methods in an embodiment, including one or more of a queue, shared memory command and data region, or via a communications protocol stream across a network or interconnect.

As used herein, active refers to a state that consumes power and is "on," while inactive refers to a state that does not generate power and is "off" or set to a low power state, The low power state may be low as compared to the active state. Compute applications which may be implemented using a scalable computing array include, but are not limited to, image processing, print imaging, display imaging, signal processing, computer graphics, media and audio processing, data mining, video analytics, and numerical processing.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM), random access memory (RAM), magnetic disk storage media, optical storage media, flash memory devices, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Figure 1:
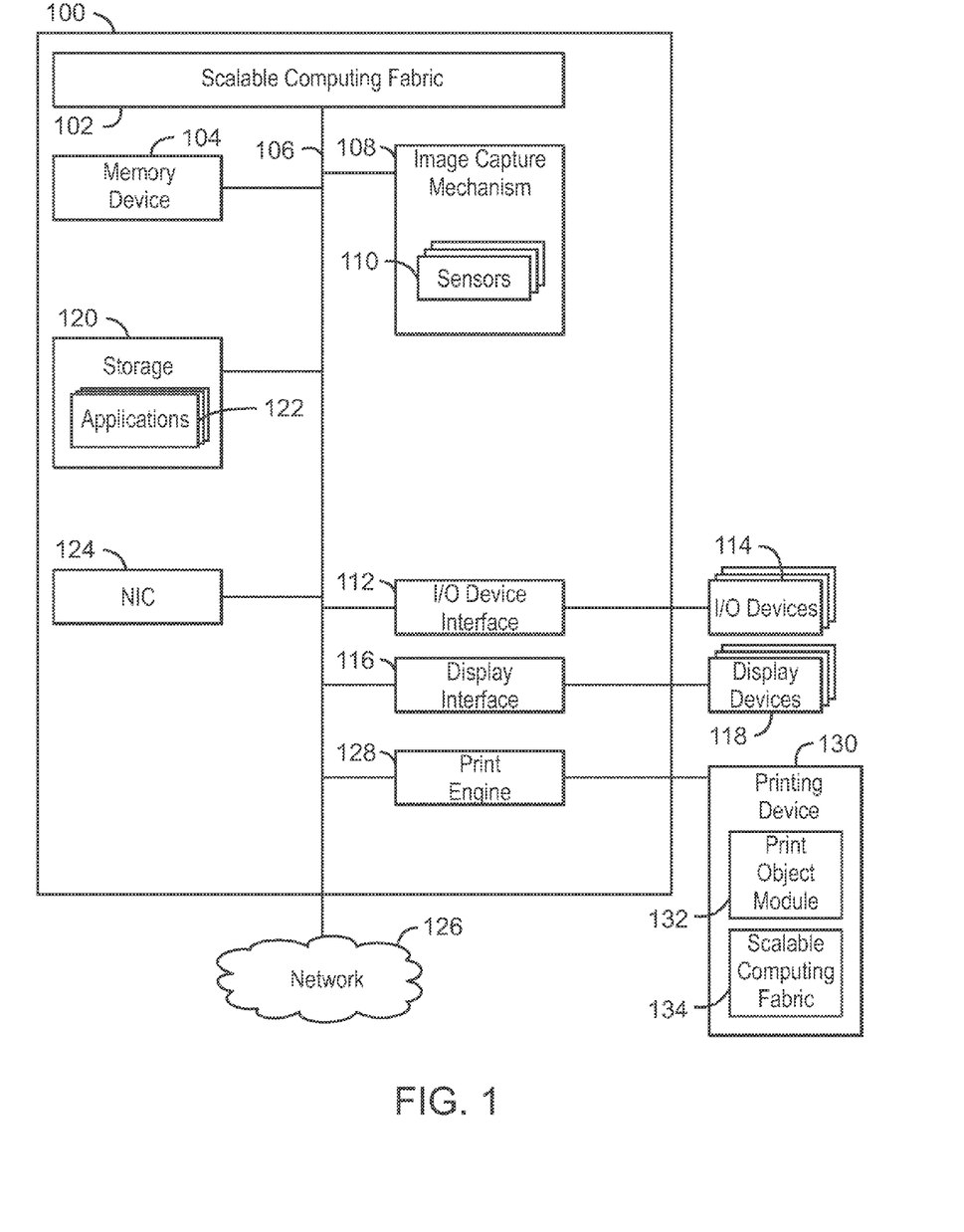
FIG. 1 is a block diagram of a computing device that may be used in accordance with embodiments.

FIG. 1 is a block diagram of a computing device 100 that may be used in accordance with embodiments. The computing device 100 may be, for example, a laptop computer, desktop computer, tablet computer, mobile device, or server, among others. The computing device 100 may include a scalable compute fabric 102 that is configured to execute stored instructions, as well as a memory device 104 that stores instructions that are executable by the scalable compute fabric 102. In some embodiments, an application programming interface (API) may be used to configure the scalable compute fabric at runtime. Additionally, in some embodiments, the scalable compute fabric may be enumerated at boot time. In this manner, the computing device can recognize the hardware capabilities of the scalable compute fabric.

The memory device 104 may be a component of the scalable compute fabric 102. The scalable compute fabric 102 may be coupled to the memory device 104 by a bus 106 and be configured to perform any operations traditionally performed by a central processing unit (CPU). Further, the scalable compute fabric 102 may be configured to perform any number of graphics operations traditionally performed by a graphics processing unit (GPU). For example, the scalable compute fabric 102 may be configured to render or manipulate graphics images, graphics frames, videos, or the like, to be displayed to a user of the computing device 100.

The scalable compute fabric 102 includes, but is not limited to, several processing resources that can be dynamically configured and reconfigured into various processing pipelines. A pipeline is a set of resources or compute elements that are grouped together to perform a specific processing task. The pipeline may perform a dynamically configurable function. The pipelines of the scalable compute fabric 102 may be configured to execute a set of instructions at runtime, based on the size and type of the instructions. In embodiments, an application programming interface (API) may be called at runtime in order to configure a processing pipeline for a particular set of instructions. For example, the API may specify the creation of five SIMD processing units to process 64-bit wide instructions at the runtime of the 64-bit wide instructions. The API may also specify the bandwidth to the scalable compute fabric 102. In embodiments, the scalable compute fabric 102 implements a fast interconnect that can be dynamically configured and reconfigured along with the processing pipelines within the scalable compute fabric 102. Additionally, the fast interconnect may be a bus that connects the computing resources or compute elements of the computing device 100. The pipelines of the scalable compute fabric 102 may also be preconfigured using a basic input/output system (BIOS). For example, when the computing device 100 is powered on, the BIOS that is ran during the booting procedure can identify the scalable compute fabric 102, including the various components of the scalable compute fabric 102. The BIOS can then pre-configure the pipelines of the scalable compute fabric 102. In embodiments, the pipelines may be reconfigured as necessary after the pre-configuration.

The scalable compute fabric is dynamically configured into multiple pipelines at run-time, each pipeline being controlled and sequenced in a shared manner allowing for multiple instructions and multiple data (MIMD) streams to be fed into the scalable computer fabric pipelines. In an embodiment, the MIMD command data streams may be fed into the scalable compute fabric using one or more methods, including but not limited to one or more of a queue, shared memory command and data region, interconnect bus, a communications protocol stream across a network or interconnect, or using similar methods. Additionally, the dynamic configuration of pipelines involves one or more MIMD sequencers or controllers that accept commands to configure a plurality of pipelines, and data from multiple software applications or multiple connected systems which the MIMD sequences feed into the pipelined resources for compute, interconnect, memory and fixed function logic blocks, which are dynamically configured into pipelines to perform a specific task. Accordingly, the pipelines are shared resources which may be used by one or more software applications or connected systems.

Within the scalable compute fabric 102, there may be one or more ALU arrays and one or more register arrays. The ALU arrays may be used to perform arithmetic and logical operations on the data stored in the register array. The register array is a special purpose memory that may be used to store the data that is used as input to the ALUs, and may also store the resulting data from the operation of the ALUs. The data may be transferred between the memory device 104 and the registers. The memory device 104 can include random access memory (RAM), read only memory (ROM), flash memory, or any other suitable memory systems. For example, the memory device 104 may include dynamic random access memory (DRAM).

The computing device 100 includes an image capture mechanism 108. In embodiments, the image capture mechanism 108 is a camera, stereoscopic camera, infrared sensor, or the like. Additionally, the image capture mechanism 108 may be a universal serial bus (USB) camera that is coupled with the computing device 100 using a USB cable. The image capture mechanism 108 is used to capture image information. In embodiments, the image capture mechanism may be a camera device that interfaces with the scalable compute fabric 102 using an interface developed according to specifications by the Mobile Industry Processor Interface (MIPI) Camera Serial Interface (CSI) Alliance, For example, the camera serial interface may be a MIPI CSI-1 Interface, a MIPI CSI-2 Interface, or a MIPI CSI-3 Interface. Accordingly, the camera serial interface may be any camera serial interface presently developed or developed in the future. In embodiments, a camera serial interface may include a data transmission interface that is a unidirectional differential serial interface with data and clock signals. Moreover, the camera interface with a scalable compute fabric may also be any Camera Parallel Interface (CPI) presently developed or developed in the future. In embodiments, the scalable compute fabric 102 is configured as an SIMD processing unit for imaging operations. The scalable compute fabric 102 can take as input SIMD instructions from a workload and perform operations based on the instructions in parallel. For example, the image capture mechanism 108 may be used to capture images for processing. The image processing workload may contain an SIMD instruction set, and the scalable compute fabric 102 may be used to process the instruction set.

The scalable compute fabric 102 may be connected through the bus 106 to an input/output (I/O) device interface 112 configured to connect the computing device 100 to one or more I/O devices 114. The I/O devices 114 may include, for example, a keyboard and a pointing device, wherein the pointing device may include a touchpad or a touchscreen, among others. The I/O devices 114 may be built-in components of the computing device 100, or devices that are externally connected to the computing device 100.

The scalable compute fabric 102 may also be linked through the bus 106 to a display interface 116 configured to connect the computing device 100 to display devices 118. The display devices 118 may include a display screen that is a built-in component of the computing device 100. The display devices 118 may also include a computer monitor, television, or projector, among others, that is externally connected to the computing device 100.

The computing device 100 also includes a storage device 120. The storage device 120 is a physical memory such as a hard drive, an optical drive, a thumbdrive, an array of drives, or any combinations thereof. The storage device 120 may also include remote storage drives. The storage device 120 includes any number of applications 122 that are configured to run on the computing device 100. The applications 122 may be used to implement a scalable compute fabric. Moreover, the instruction sets of the applications 122 may include, but are not limited to very long instruction words (VLIW) and single instruction multiple data (SIMD) instructions. The instruction sets may be processed using the scalable compute fabric 102. The computing device 100 may also include a network interface controller (NIC) 124. The NIC 124 may be configured to connect the computing device 100 through the bus 106 to a network 126. The network 126 may be a wide area network (WAN), local area network (LAN), or the Internet, among others.

In embodiments, the scalable compute fabric can send the resulting image from a processed imaging workload to a print engine 128. The print engine 128 can send the resulting imaging workload to a printing device 130. The printing device 130 can include printers, fax machines, and other printing devices that can print the resulting image using a print object module 132. In embodiments, the print engine 128 may send data to the printing device 130 across the network 126. Moreover, in embodiments, the printing device 130 may include another scalable compute fabric 134 that may be used to process workloads using the printing device 130.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., sensors, power management integrated circuits, additional network interfaces, etc.).

Figure 2:
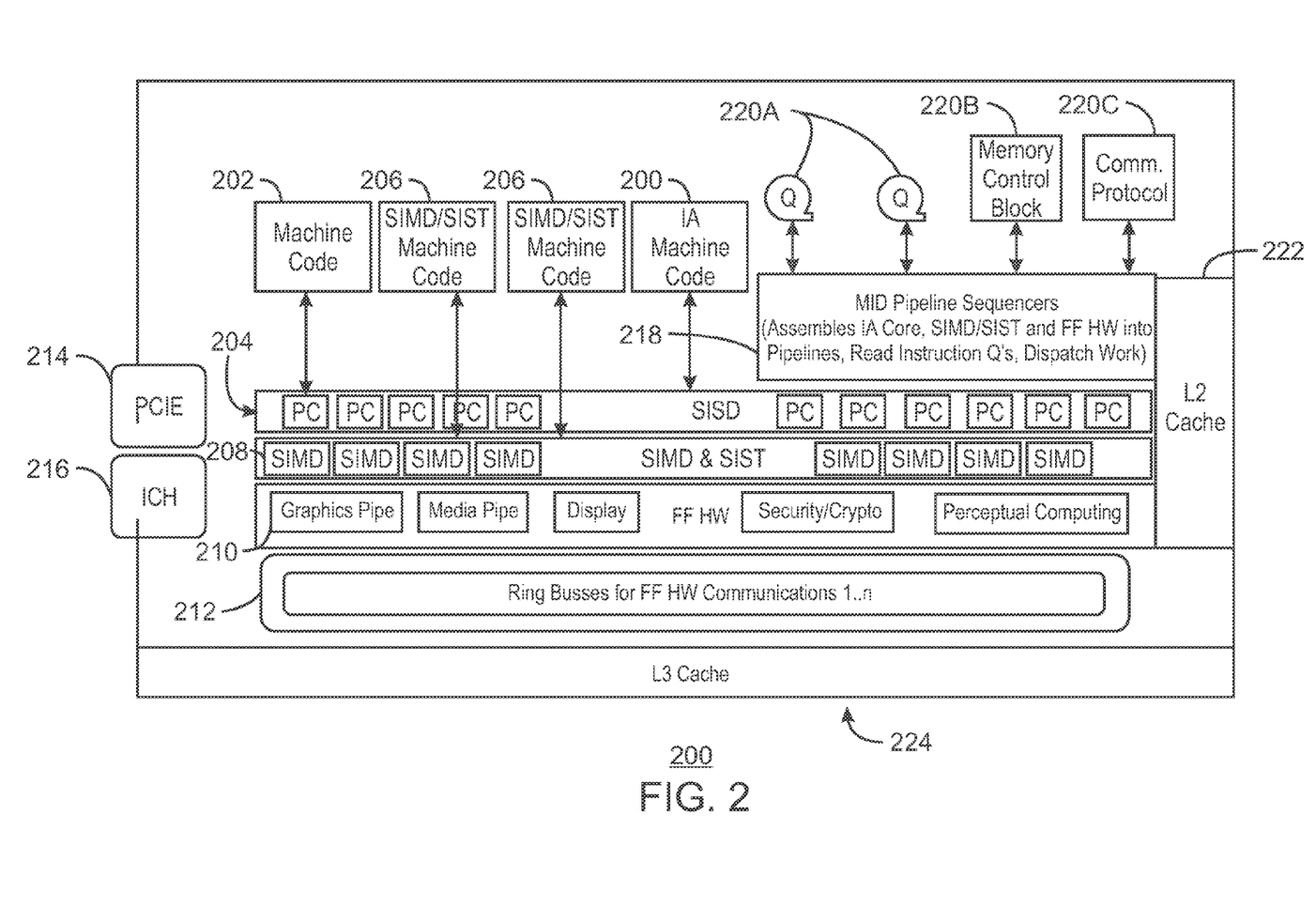
FIG. 2 is a diagram of a scalable compute fabric that illustrates the components of a typical CPU, GPU, and fixed function hardware merged into a common fabric, in accordance with embodiments of the present invention.

FIG. 2 is a diagram of a scalable compute fabric 200 that illustrates typical CPU, GPU, and fixed function hardware merged into a common fabric, in accordance with embodiments of the present invention. The scalable compute fabric 200 may be, for example, the scalable compute fabric 102 (FIG. 1). The scalable compute fabric 200 may also be a scalable compute fabric 134 that is a component of a printing device, such as printing device 130 (FIG. 1).

The scalable compute fabric 200 enables existing machine code to execute on cores that correspond to the particular machine code. Thus, machine code that would be executed using a CPU may be executed using the scalable compute fabric 200. Moreover, machine code that would be executed using a GPU may be executed using the scalable compute fabric 200. Accordingly, the scalable compute fabric 200 includes machine code 202, which is used to control the single instruction, single data (SISD) processing cores 204 that can execute the particular machine code 202. In embodiments, the processing cores may be Intel® Architecture (IA) CPU Cores or hyperthreads. The processing cores 204 may execute the native data types, instructions, registers, addressing modes, memory architecture, and interrupt handling specified by the machine code 202. Also included in the scalable compute fabric 200 is single instruction multiple data (SIMD) and single instruction single thread machine code 206. The SIMD/SIST machine code 206 may be used to instruct one or more SIMD processing units 208. In embodiments, the SIMD processing units 208 include Intel® Advanced Vector Extensions (AVX) and execution units (EU) merged into a standalone resource. The SIMD processing units may also be referred to as a SIMD computing array. The SIMD processing units 208 may be further described with respect to FIG. 3.

Each configured pipeline of the scalable compute fabric 200 is guaranteed the necessary bus bandwidth and execution priority through programmable fairness policies and various allocations schemes. The fixed function hardware 210 may be represented in the scalable compute fabric 200. For example, the fixed function hardware may include graphics, display, media, security or perceptual computing units. In embodiments, the fixed function hardware may be implemented using resources or compute elements of the scalable compute fabric. In this manner, the fixed function hardware may be replaced by other hardware that has either lower power or more efficient computation. The fixed function hardware units within the scalable compute fabric 200 may be dynamically locked, shared, and assigned into pipelines. For example, encoding a media workload typically includes, among other things, performing motion estimation. When a two dimensional (2D) video is encoded, a motion estimation search may be performed on each frame of the video in order to determine the motion vectors for each frame. Motion estimation is a technique in which the movement of objects in a sequence of frames is analyzed to obtain vectors that represent the estimated motion of the object between frames. Through motion estimation, the encoded media file includes the parts of the frame that moved without including other portions of the frame, thereby saving space in the media file and saving processing time during decoding of the media file. The frame may be divided into macroblocks, and the motion vectors represent the change in position of a macroblock between frames. The motion vectors may be determined by a pipeline configured using the scalable compute fabric 200 that includes a media fixed function unit.

Ring busses 212 may be included for communications between the fixed function hardware units. The ring buffer 212 may be used to transfer data through an assembled pipeline. Additionally, a peripheral component interconnect express (PCIE) bus 214 and an input/output controller hub (ICH) bus 216 may provide inputs into the scalable compute fabric 200. However, the present techniques are not limited to the interconnect methods described herein, as a wide range of other interconnect methods may be used in embodiments.

A multiple instruction multiple data (MIMD) pipeline sequencer 218 may be used to assemble the processing cores 204, the SIMD processing units 208, and the fixed function hardware 210 into pipelines as needed based on incoming instructions. The instructions may be obtained from instruction queues 220A. Additionally, MIMD sequencers may accept data and control commands from instruction control blocks 220B in memory or from a protocol stream on a network or interconnect 220C. Memory resources within the scalable compute fabric 200 may be locked using dynamically configured pipelines. For example, a level 2 (L2) cache 222 and a level 3 (L3) cache 224 may also be included in the scalable compute fabric 200 to stare data.

Figure 3:
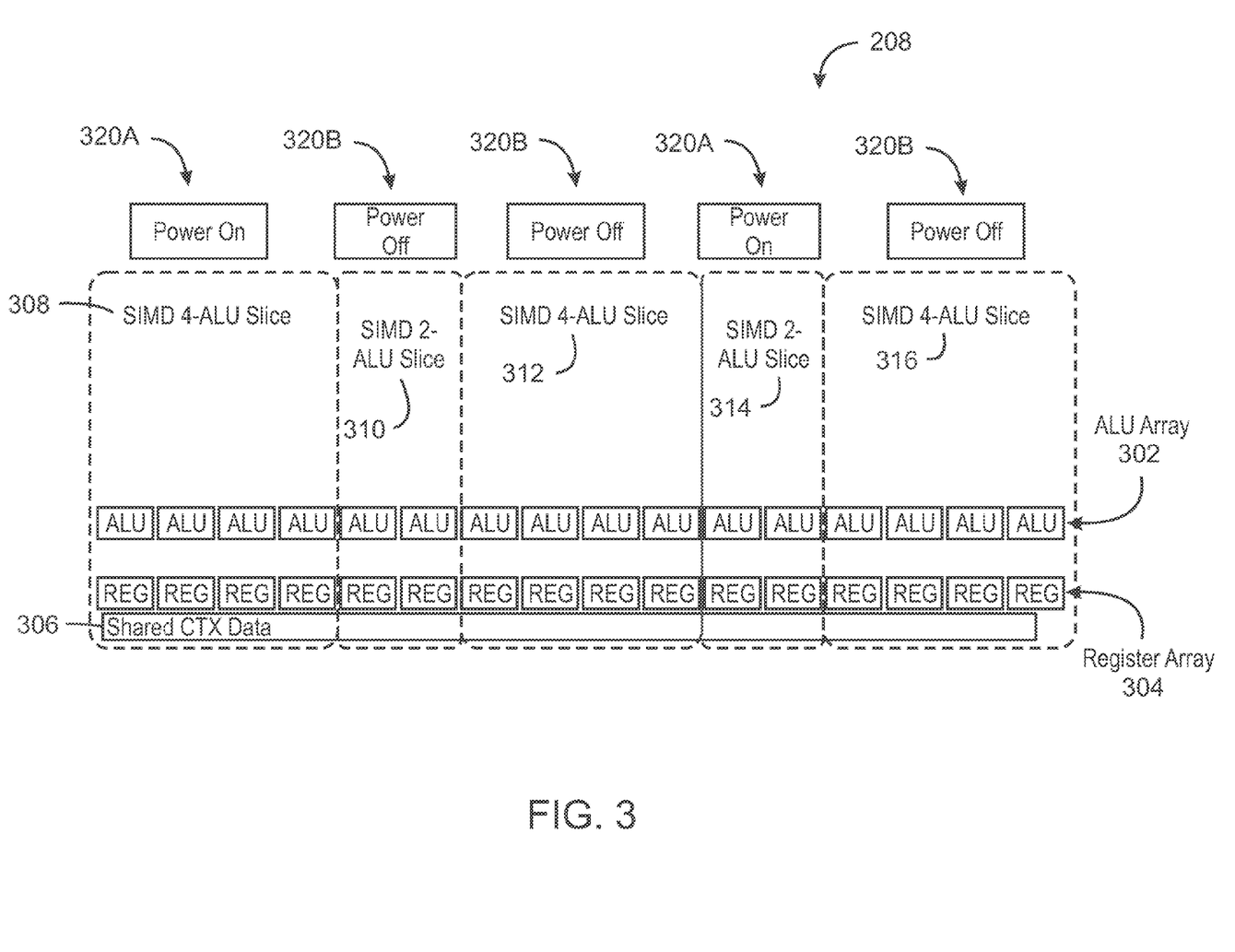
FIG. 3 is a diagram illustrating the SIMD processing units, in accordance with embodiments.

FIG. 3 is a diagram illustrating the SIMD processing units 208, in accordance with embodiments. The SIMD processing units 208 may be within an SIMD computing array that may includes at least one or more of an advanced vector extension (AVX) single instruction multiple data (SIMD) unit or an execution unit (EU) merged into a dynamically configurable and sharable computing resource. Each SIMD processing unit 208 is a slice of SIMD processing resources. In other words, each slice is an independent SIMD processing unit 208. A slice refers to a set or grouping of lanes, where each lane includes at least one arithmetic and logical unit (ALU) and at least one register. The SIMD processing units 208 include an ALU array 302 and a register array 304. The ALU array 302 may be used to perform arithmetic and logical operations on the data stored in the register array 304. The register array 304 is a special purpose memory that may be used to store the data that is used as input to the ALU array 302, and may also store the resulting data from the operation of the ALU array 302. The register array 304 may be a component of a shared memory that also includes shared context of machine (CTX) data 306. The shared CTX data 306 may store machine contexts and associated data, such as program counters, register settings, dock frequencies, voltage levels, and all other machine state data.

Each of the SIMD processing units 208 may be configured to be a different width, depending on the size and type of the workload to be processed. In this manner, the width of each SIMD processing unit is based on the particular problem being addressed in each piece of software run on the computer. The width of each SIMD processing unit 208 is the number of lanes in each slicein FIG. 3, the SIMD processing units 208 include an SIMD 4-ALU slice 308 that includes four ALU lanes, an SIMD 2-ALU slice 310 that includes two lanes, an SIMD 4-ALU slice 312 that includes four lanes, an SIMD 2-ALU slice 314 that includes two lanes, and an SIMD 4-ALU slice 316 that includes four lanes. As shown in FIG. 3, the SIMD ALU slice 308 and the SIMD slice 314 are both powered on, as denoted by the power on status 320A above each SIMD slice, respectively. Similarly, the SIMD ALU slice 310, the SIMD ALU slice 312 and the SIMD ALU slice 316 are all powered off, as denoted by the power off status 320B above each SIMD slice, respectively.

In embodiments the SIMD ALU slice 310, the SIMD ALU slice 312 and the SIMD ALU slice 316 are all powered off in response to a determination that the ALU units within the SIMD ALU slice 310, the SIMD ALU slice 312 and the SIMD ALU slice have been inactive. Inactivity may be determined by a controller monitoring the ALUs. When the ALUs have been idle for more than a predetermined amount of clock cycles, they may be turned off. Additionally, a program counter could be used to determine which ALUs could be powered off.

Figure 4:
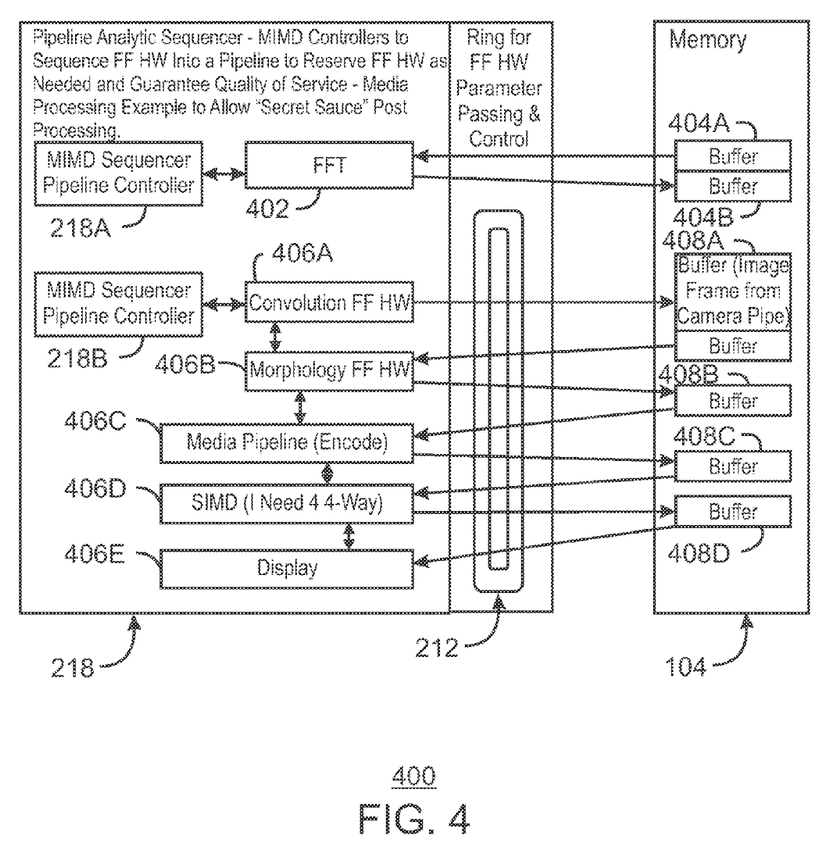
FIG. 4 is a diagram illustrating the MIMD sequencer pipeline controllers, in accordance with embodiments.

FIG. 4 is a diagram illustrating the MIMD sequencer pipeline controllers 218, in accordance with embodiments. Information from the input queues, such as the input queues 220 (FIG. 2) is input to the MIMD sequencer pipeline controllers 218. The MIMD sequencer pipeline controllers 218 take the information from the instruction queues 220A (FIG. 2) and route the information to various pipelines that are formed within the scalable compute fabric. In embodiments, MIMD sequencers may accept data and control commands from instruction control blocks 220B in memory or from a protocol stream on a network or interconnect 220C.

For example, the MIMD sequencer pipeline controller 218A may reserve a Fast Fourier Transform (FFT) module 402 whenever an instruction queue contains instructions that include computing a Fourier transform. Digital signal processing (DSP) applications often include the use of a FFT processing core. The FFT module 402 may be implemented using hardware or software. The data used by the FFT module 402 may be retrieved from a buffer 404A in the memory 104. Once processed, the data may be written back to a buffer 404B in memory. Accordingly, the pipeline may be controlled by the MIMD sequencer pipeline controller 218A.

In parallel with the MIMD sequencer pipeline controller 218A, an MIMD sequencer pipeline controller 218B may be used to configure another pipeline for image processing. An instruction queue, such as the input queues 220A (FIG. 2), may instruct the MIMD sequencer pipeline controller 218B to configure a pipeline containing various modules for image processing. In response to the instructions, the MIMD sequencer pipeline controller 218B may reserve a convolution fixed function hardware unit 406A, a morphology fixed function hardware unit 406B, a media pipeline 406C, an SIMD processing unit 406D, and a display module 406E. The SIMD processing unit 406D may be an SIMD processing unit 208 as described above in embodiments, MIMD sequencers may accept data and control commands from instruction control blocks 220B in memory or from a protocol stream on a network or interconnect 220C.

The convolution fixed function hardware unit 406A may receive image data from an image capture mechanism, such as the image capture mechanism 108 (FIG. 1). Linear filtering of the image data from the image capture mechanism may occur using the convolution fixed function hardware unit 406A and the morphology fixed function hardware unit 406B. The data from the convolution fixed function hardware unit 406A may be written to the buffer 408A in the memory 104. The morphology fixed function hardware unit 406B may obtain data from the buffer 408A. The media pipeline 406C is used to encode the image data. The image data may be obtained from a buffer 408B within the memory 104. The media pipeline 406C is an additional pipeline that executes various hardware and software modules to encode the image data. For example, a media pipeline for encoding image data can include performing motion estimation to determine the motion vectors and macroblock types of the frames within the image data. Additionally, encoding the image data may include applying a different bit rate to each frame. When the image data is encoded, it is converted to a target data format. The data may then be written to a buffer 408C in the memory 104.

The SIMD processing unit 406D may obtain the data from the buffer 408C in the memory 104. Additional image processing may be performed by the SIMD processing unit 406D, such as optimizing the data for a particular display. The data may then be written to a buffer 408D in the memory 104. A display module 406E may obtain the data from the buffer 408D in the memory 104 and render the data on a display.

When the image data is passed between the pipeline modules 406 and the buffers 408 in the memory 104, a ring buffer 212 may be used to pass the data from the pipeline modules 406 to the buffers 408. Additionally, the ring buffer 212 may transfer data between the pipeline modules 406 without accessing the buffers 408. For example, the image data is typically processed line by line. The convolution fixed function hardware unit 406A may process a line of image data and place it in the ring buffer 212. The ring buffer may send the data directly to the morphology fixed function hardware unit 406B for further processing. In the event that the morphology fixed function hardware unit 406B is unable to process the image data sent by the convolution fixed function hardware unit 406A, the ring buffer 212 can place the data in the buffer 408A until the morphology fixed function hardware unit 406B is able to process the image data.

Figure 5:
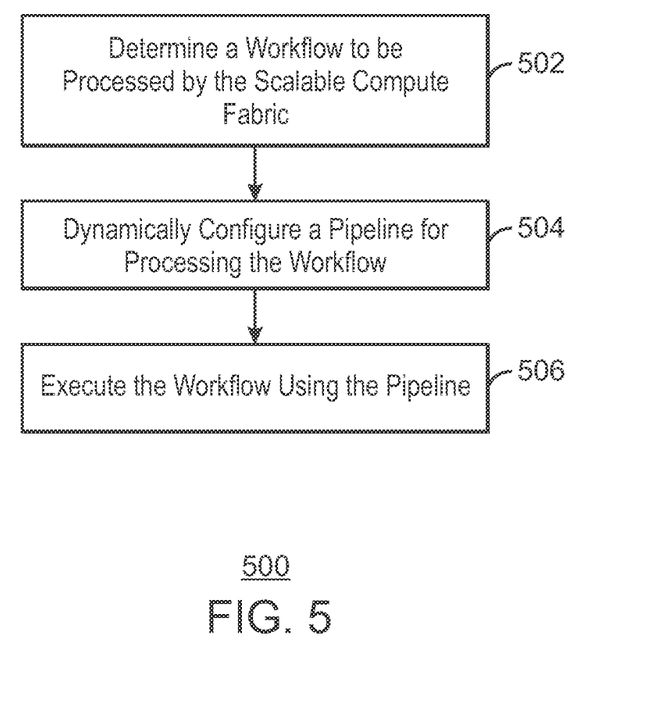
FIG. 5 is a process flow diagram of a method for providing a scalable compute fabric, in accordance with embodiments.

FIG. 5 is a process flow diagram of a method for providing a scalable compute fabric, in accordance with embodiments. At block 502 a workflow to be processed by the scalable compute fabric is determined. The workflow may be based on an instruction set of a software program. In embodiments, the workflow may be obtained from the instruction queues. At block 504, a pipeline may be configured dynamically for processing the workflow. The pipeline may include a processing core, an SIMD computing array, or any combination thereof. The SIMD computing array may include one or more SIMD processing units. In embodiments, the pipeline may be configured by allocating compute resources to the pipeline, reserving memory resources and bus bandwidth for the pipeline, and scheduling the workflow use of the pipeline. The configuration may be performed by a controller. In embodiments, the controller is a MIMD sequencer pipeline controller. Additionally, the pipeline may include one or more processing cores and one or more SIMD processing units. At least one processing core or SIMD processing unit may be powered off in response to a size of a workflow. Additionally, at least one processing core or SIMD processing unit may be powered off in response to a dynamic configuration of resources into a pipeline to support a workflow.

At block 506, the workflow may be executed using the pipeline. In embodiments, the method may be executed using a pipeline of a computing device or pipeline of a printing device. Executing the workflow may include processes such as image processing, image enhancements, image analysis, computer vision, augmented reality, depth sensing, gesture recognition, face recognition, computer gaming, computer graphics, media processing, camera or sensor processing, camera processing, display processing, image conversion, and any combination thereof.

The process flow diagram of FIG. 5 is not intended to indicate that the steps of the method 500 are to be executed in any particular order, or that all of the steps of the method 500 are to be included in every case. Further, any number of additional steps may be included within the method 500, depending on the specific application. For example, the printing device 130 may print an image that was previously processed using a scalable compute fabric.

Figure 6:
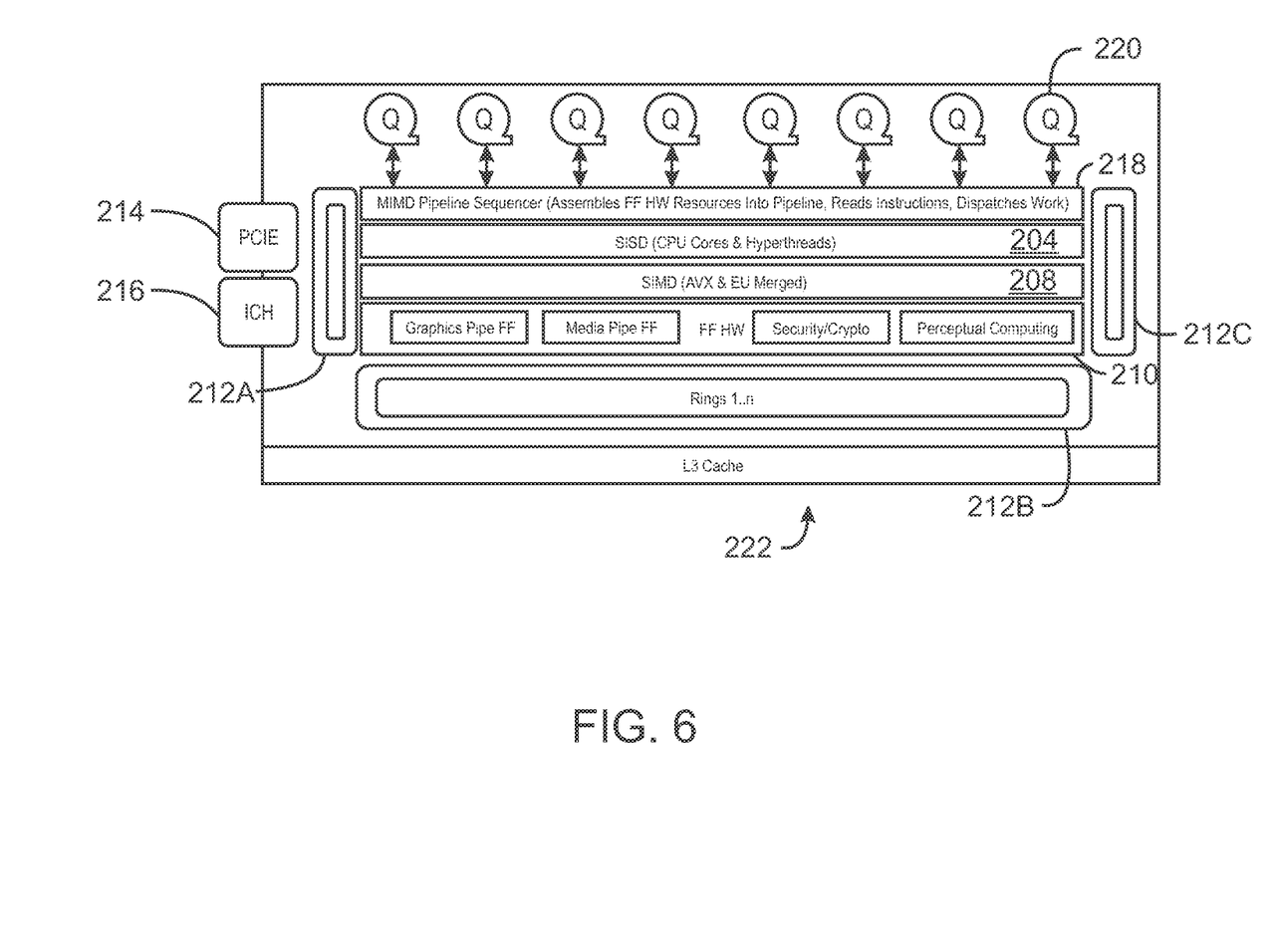
FIG. 6 is a diagram of a scalable compute fabric, in accordance with embodiments of the present invention.

FIG. 6 is a diagram of a scalable compute fabric 600, in accordance with embodiments of the present invention. The scalable compute fabric 600 may be, for example, the scalable compute fabric 102 (FIG. 1). The scalable compute fabric 600 may also be a scalable compute fabric 134 that is a component of a printing device, such as printing device 130 (FIG. 1).

The Peripheral Component Interconnect Express (PCIE) bus 214 and the Input/Output Controller Hub (ICH) 216 may provide input/output to the scalable compute fabric 600. The scalable compute fabric 600 also includes ring buffer 212A, ring buffer 212B, and ring buffer 212C. The ring buffer 212A enables the PCIE bus 214 and the ICH 216 to send data to the MIMD sequencer pipeline controllers 218, the SISD processing cores 204, the SIMD processing units 208, and the fixed function hardware 210. Furthermore, the ring buffer 212B enables the fixed function hardware units 210 to pass data to an L3 cache 222. Although only an L3 cache 222 is shown, any number of caches may be present in a scalable computing fabric. As discussed above, the ring buffer 212B enables data to be passed directly from one fixed function hardware unit to another fixed function hardware unit. The ring buffer 212C enables data to be passed directly between the MIMD sequencer pipeline controllers 218, the SISD processing cores 204, the SIMD processing units 208, and the fixed function hardware 210. Although three ring buffers are shown, the scalable compute fabric may include any number of ring buffers. Further, the ring buffers may be dynamically configured and reconfigured based on instructions, such as the instructions from the instruction queues 220A. The ring buffers may also be reconfigured based on data from the memory control block 220B or the communications protocol 220C.

In embodiments, the MIMD sequencer pipeline controllers may include priority levels. Thus, if a first MIMD sequencer pipeline controller has a higher priority than a second MIMD sequencer pipeline controller, the first MIMD sequencer pipeline controller is able to interrupt the second MIMD sequencer pipeline controller if the second MIMD sequencer pipeline controller is using a resource or compute element that the first MIMD sequencer pipeline controller would like to use in addition, resources may be shared among pipelines, and the MIMD sequencer arbitrates resource sharing between pipelines based on a programmable policy, such as priority, desired bandwidth, performance, or any other policy used to manage resources in embodiments, the MIMD sequencer pipeline controllers arbitrate the use of scalable compute fabric resources. The MIMD sequencer pipeline controllers also ensure that the data and instructions will fit the configured pipeline. Accordingly, multiple MIMD sequencer pipeline controllers can perform arbitration, prioritization, contention, and management, of resources of the scalable compute fabric, In embodiments, the scalable compute fabric may be used in a printing device, such as the printing device 130. For example, the printing device may include a scanning module that can scan documents. The printing device may convert the scanned documents to various file formats, such as a PDF file format. The printing device may also be used to enhance the scanned document or alter images within the scanned document. Accordingly, using the scalable compute fabric, a pipeline can be configured to perform the various tasks assigned to the printer, including, but not limited to scanning, file format conversion, enhancements, and image alterations. Additionally, in embodiments, the scalable compute fabric may be integrated with a printing environment that includes resources for printing. A computing device that includes a scalable compute fabric may also be integrated into a printing environment.

The present techniques create a pipeline which can be streamlined and optimized for a given processing, a data flow. Currently, SOC architecture is designed in a general purpose manner to generally serve a variety of workloads in an adequate manner. Many resources or compute elements are not available for individual, dynamically configurable use. For example, many of the current GPU fixed function hardware compute resources are not available for individual use and configuration into specific pipelines. Through the present techniques, each component, resource, or compute element is individually available and accessible. Further, each component, resource, or compute element can be dynamically configured or reconfigured depending on the particular workload to be processed.

Example 1

A method for providing scalable compute fabric provided herein. Logic is provided to determine a workflow for processing by the scalable compute fabric. The workflow is based on an instruction set. Logic is provided to dynamically configure a pipeline for processing the workflow, and logic is provided to execute the workflow using the pipeline. The pipeline may be configured by allocating compute resources to the pipeline, reserving memory resources and bus bandwidth for the pipeline, and scheduling the workflow use of the pipeline. The pipeline may be used simultaneously by a plurality of software applications or other connected systems to accept multiple instruction multiple data (MID) streams and sequence the NAND streams through the pipeline. Also, multiple pipelines may be configured to accept simultaneous multiple instruction multiple data(MIMD) streams, and the pipelines may be operational across shared computing, memory, logical and interconnect resources. Further, the pipeline may include one or more processing cores. At least one processing cores may be powered off in response to a size of a workflow. Additionally, at least one processing core may be powered off in response to a dynamic configuration of resources into a pipeline to support a workflow.

All or a portion of the pipeline may be powered down into a lower power state, a lower clock rate for lower performance, or set to a higher clock rate for higher performance. A voltage may be adjusted in the pipeline to achieve higher or lower power and performance rates. The pipeline may also include an SIMD computing array. The SIMD computing array may include at least one or more of a advanced vector extension (AVX)® single instruction multiple data (SIMD) unit or an execution unit (EU) merged into a dynamically configurable and sharable computing resource. The pipeline may perform a dynamically configurable function. Additionally, executing the workflow may include image processing, image enhancements, image analysis, computer vision, augmented reality, depth sensing, gesture recognition, face recognition, computer gaming, computer graphics, media processing, camera or sensor processing, camera processing, display processing, image conversion, or any combination thereof. Further, the provided scalable compute fabric can be integrated into a printing environment.

Example 2

A computing device with a scalable compute fabric is provided herein. The computing device includes a sequencer and a plurality of logical processing elements. The plurality of logical processing elements include a processing core, a logic block, an I/O device, an I/O channel, a bus, a display device, and a memory resource. The sequencer controls and sequences commands and data in an imaging pipeline, and the sequencer, processing core, logic block, I/O device, I/O channel, bus, display device, and memory resource comprise the scalable compute fabric that is dynamically configurable to generate the imaging pipeline. The sequencer also accepts multiple instructions multiple data (MIMD) streams from one or more of a queue, shared memory command and data region, or a communications protocol stream across a network or interconnect.

The scalable compute fabric may be implemented using a system on a chip (SOC). Additionally, the imaging pipeline may be dynamically reconfigurable. The imaging pipeline may also be preconfigured. The plurality of logical processing elements may be reserved for use by a sequencer, or allocated into processing groups or pipelines. Further, at least one or more of the plurality of logical compute elements may be powered off in response to a size of a workflow or compute activity, or inactivity of the workflow. The scalable compute fabric may include an SIMD compute array, the SIMD compute array including an arithmetic and logical unit (ALU) array that comprises a plurality of ALUs, and a register array that comprises a plurality of registers. The sequencer may be configured to reserve and control logical compute elements and assemble them into a compute pipeline, perform arbitration, prioritization, and contention management for the imaging pipeline. The scalable compute fabric may also include a fixed function hardware unit. Additionally, the computing device may be an image capture device or an image display device. The computing device may also be integrated into a printing environment.

Example 3

A printing device to print a workload is described herein. The printing device includes a print object module. The print object module may be configured to determine a workflow for processing by the scalable compute fabric and dynamically configure a pipeline for processing the workflow. The workflow is executed using the pipeline. The workflow may be an imaging workload. Further, processing the workflow may include at least one or more of image processing, image enhancements, image analysis, image input, and image conversion.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the farm of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method for providing a scalable compute fabric, comprising:
   logic to determine a workflow for processing by the scalable compute fabric, wherein the workflow is based on an instruction set;
   logic to configure a pipeline dynamically for processing the workflow, wherein the configuration of the pipeline is based on a size and a type of instructions of the instruction set;
   wherein configuration includes dynamically locking, sharing, and assigning fixed function hardware units within the scalable compute fabric into pipelines, the sharing based on a programmable policy; and
   logic to execute the workflow using the pipeline.

2. The method of claim 1, wherein the pipeline is configured by:
   allocating compute resources to the pipeline;
   reserving memory resources and bus bandwidth for the pipeline;
   scheduling the workflow use of the pipeline.

3. The method of claim 1, wherein the pipeline may be used simultaneously by a plurality of software applications or other connected systems to accept multiple instruction multiple data (MIMD) streams and sequence the MIMD streams through the pipeline.

4. The method of claim 1, wherein multiple pipelines are configured to accept simultaneous multiple instruction multiple data (MIMD) streams, and the pipelines are operational across shared computing, memory, logical and interconnect resources.

5. The method of claim 1, wherein the pipeline comprises one or more processing cores.

6. The method of claim 5, wherein at least one processing cores is powered off in response to a size of a workflow.

7. The method of claim 5, wherein at least one processing core is powered off in response to a dynamic configuration of resources into a pipeline to support a workflow.

8. The method of claim 1, where all or a portion of the pipeline is powered down into a lower power state, a lower clock rate for lower performance, or set to a higher clock rate for higher performance.

9. The method of claim 1, where a voltage may be adjusted in the pipeline to achieve higher or lower power and performance rates.

10. The method of claim 1, wherein the pipeline comprises an SIMD computing array.

11. The method of claim 10, wherein the SIMD computing array comprises at least one or more of an advanced vector extension (AVX)® single instruction multiple data (SIMD) unit or an execution unit (EU) merged into a dynamically configurable and sharable computing resource.

12. The method of claim 1, wherein the pipeline performs a dynamically configurable function.

13. The method of claim 1, wherein executing the workflow comprises:
   image processing;
   image enhancements;
   image analysis;
   computer vision;
   augmented reality;
   depth sensing;
   gesture recognition;
   face recognition;
   computer gaming;
   computer graphics;
   media processing;
   camera or sensor processing;
   camera processing;
   display processing;
   image conversion; or
   any combination thereof.

14. The method of claim 1, wherein the provided scalable compute fabric is integrated into a printing environment.

15. A computing device with a scalable compute fabric, comprising:
   a sequencer;
   a plurality of logical processing elements comprising:
      a processing core;
      a logic block;
      an I/O device;
      an I/O channel;
      a bus;
      a display device; and
      a memory resource, wherein the sequencer controls and sequences commands and data in an imaging pipeline, and the sequencer, processing core, logic block, I/O device, I/O channel, bus, display device, and memory resource comprise the scalable compute fabric that is dynamically configurable to generate the imaging pipeline, wherein the configuration of the pipeline is based on a size and a type of instructions of the instruction set, wherein configuration includes dynamically locking, sharing, and assigning fixed function hardware units within the scalable compute fabric into pipelines, the sharing based on a programmable policy, and wherein the sequencer accepts multiple instructions multiple data (MIMD) streams from one or more of a queue, shared memory command and data region, or a communications protocol stream across a network or interconnect.

16. The computing device of claim 15, wherein the scalable compute fabric is implemented using a system on a chip (SOC).

17. The computing device of claim 15, wherein the imaging pipeline is dynamically reconfigurable.

18. The computing device of claim 15, wherein the imaging pipeline is pre-configured.

19. The computing device of claim 15, wherein the plurality of logical processing elements are reserved for use by a sequencer, or allocated into processing groups or pipelines.

20. The computing device of claim 15, wherein at least one or more of the plurality of logical compute elements are powered off in response to a size of a workflow or compute activity, or inactivity of the workflow.

21. The computing device of claim 15, wherein the scalable compute fabric includes an SIMD compute array, comprising:
   an arithmetic and logical unit (ALU) array that comprises a plurality of ALUs; and
   a register array that comprises a plurality of registers.

22. The computing device of claim 15, wherein the sequencer is configured to reserve and control logical compute elements and assemble them into a compute pipeline, perform arbitration, prioritization, contention management for the imaging pipeline.

23. The computing device of claim 15, wherein the scalable compute fabric comprises a fixed function hardware unit.

24. The computing device of claim 15, wherein the computing device is an image capture device or an image display device.

25. The computing device of claim 15, wherein the computing device is integrated into a printing environment.

26. A printing device to print a workload, comprising a print object module configured to:
   determine a workflow for processing a scalable compute fabric;
   configure a pipeline dynamically for processing the workflow, wherein the
   configuration of the pipeline is based on a size and a type of instructions of the instruction set, wherein configuration includes dynamically locking, sharing, and assigning fixed function hardware units within the scalable compute fabric into pipelines, the sharing based on a programmable policy; and
   execute the workflow using the pipeline.

27. The printing device of claim 26, wherein the workflow is an imaging workload.

28. The printing device of claim 26, wherein processing the workflow includes at least one or more of:
   image processing;
   image enhancements;
   image analysis;
   image input;
   image conversion; or
   any combination thereof.

* * * * *